United States Patent
Park et al.

(10) Patent No.: US 8,902,297 B2
(45) Date of Patent: Dec. 2, 2014

(54) STEREOSCOPIC IMAGE DISPLAY AND METHOD FOR DRIVING THE SAME

(75) Inventors: Jaewoo Park, Gyeonggi-do (KR); Joonyoung Park, Gyeonggi-do (KR); Keongjin Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 469 days.

(21) Appl. No.: 12/963,970

(22) Filed: Dec. 9, 2010

(65) Prior Publication Data

US 2011/0273440 A1    Nov. 10, 2011

(30) Foreign Application Priority Data

May 6, 2010   (KR) .................. 10-2010-0042517

(51) Int. Cl.
*H04N 13/04* (2006.01)
*G06T 15/00* (2011.01)
*G09G 5/10* (2006.01)
*G09G 3/00* (2006.01)
*G09G 3/36* (2006.01)
*G09G 3/34* (2006.01)

(52) U.S. Cl.
CPC ......... *G09G 3/3696* (2013.01); *H04N 13/0438* (2013.01); *G09G 3/003* (2013.01); *G09G 3/3406* (2013.01); *G09G 2320/0209* (2013.01); *H04N 13/0452* (2013.01); *G09G 2320/0673* (2013.01); *H04N 13/0497* (2013.01); *G09G 3/3648* (2013.01); *G09G 2320/064* (2013.01)
USPC .............. 348/51; 345/419; 345/690; 345/212

(58) Field of Classification Search
CPC ................ G09G 2320/0209; G09G 2320/064; G09G 2320/0673; G09G 3/003; G09G 3/3406; G09G 3/3648; G09G 3/3696; H04N 13/0438; H04N 13/0452; H04N 13/0497
USPC ........................................................... 348/51
See application file for complete search history.

(56) References Cited

U.S. PATENT DOCUMENTS 5,821,989 A    10/1998   Lazzaro et al.
8,237,643 B2 *  8/2012   Wu et al. .......................... 345/84

(Continued)

FOREIGN PATENT DOCUMENTS

| CN | 1573425 A | 2/2005 |
| KR | 10-09108065 | 9/2009 |
| TW | 201007678 A | 2/2010 |

OTHER PUBLICATIONS

Office Action dated Apr. 17, 2013 from the Korean Patent Office in counterpart application No. 10-2010-0042517.

(Continued)

*Primary Examiner* — Anner Holder
(74) *Attorney, Agent, or Firm* — Morgan, Lewis & Bockius LLP

(57) ABSTRACT

A stereoscopic image display and a method for driving the same are disclosed. The stereoscopic image display includes a display panel displaying a two-dimensional (2D) image data in a 2D mode and displaying a three-dimensional (3D) image data in a 3D mode, a gamma reference voltage generating circuit that generates first gamma reference voltages and second gamma reference voltages different from the first gamma reference voltages, outputs the first gamma reference voltages in the 2D mode, and outputs the second gamma reference voltages in the 3D mode, and data driver that converts the 2D image data into the first gamma reference voltages in the 2D mode and converts left eye image data and right eye image data into the second gamma reference voltages in the 3D mode.

8 Claims, 7 Drawing Sheets

(56) References Cited

U.S. PATENT DOCUMENTS

| | | |
|---|---|---|
| 2005/0012700 A1 | 1/2005 | Hara |
| 2006/0038837 A1* | 2/2006 | Hong .......................... 345/691 |
| 2007/0022949 A1 | 2/2007 | Saito |
| 2007/0242068 A1* | 10/2007 | Han et al. ..................... 345/427 |
| 2008/0013001 A1* | 1/2008 | Jang et al. ..................... 349/15 |
| 2009/0244387 A1 | 10/2009 | Lee et al. |
| 2010/0039503 A1* | 2/2010 | Lin et al. ....................... 348/51 |
| 2010/0097449 A1* | 4/2010 | Jeong et al. ................... 348/59 |
| 2010/0277494 A1* | 11/2010 | Cho et al. ...................... 345/589 |

OTHER PUBLICATIONS

The First Office Action dated Jun. 9, 2013 from The State Intellectual Property Office of the People's Republic of China in counterpart Chinese application No. 201010610397.8.

* cited by examiner

STEREOSCOPIC IMAGE DISPLAY AND METHOD FOR DRIVING THE SAME

This application claims the benefit of Korea Patent Application No. 10-2010-0042517 filed on May 6, 2010, the entire contents of which is incorporated herein by reference for all purposes as if fully set forth herein.

BACKGROUND OF THE INVENTION

1. Field of the Invention

The present invention relates to a stereoscopic image display and a method for driving the same.

2. Discussion of the Related Art

A stereoscopic image display is classified into a display using a stereoscopic technique and a display using an autostereoscopic technique.

The stereoscopic technique, which uses a parallax image between left and right eyes of a user with a high stereoscopic effect, includes a glasses type method and a non-glasses type method. In the glasses type method, the parallax image between the left and right eyes is displayed on a direct-view display or a projector through a change in a polarization direction of the left and right parallax image or in a time-division manner, and thus a stereoscopic image is implemented using polarization glasses or shutter glasses. In the non-glasses type method, an optical axis of the parallax image between the left and right eyes is separated generally using an optical plate such as a parallax barrier and a lenticular lens, and thus the stereoscopic image is implemented.

U.S. Pat. No. 5,821,989 and US Publication No. 2007022949A1 are known to disclose an example of the glasses type stereoscopic image display.

FIG. 1 schematically illustrates a glasses type stereoscopic image display. In FIG. 1, a black region of shutter glasses ST represents a shutter that blocks light traveling toward an observer (i.e., viewer), and a white region of the shutter glasses ST represents a shutter allowing transmission of light toward the observer. When a liquid crystal display element is selected as a display element DIS, a backlight unit providing light to the display element DIS is necessary.

As shown in FIG. 1, during odd-numbered frame periods, left eye image data $RGB_L$ is written to the display element DIS, and a left eye shutter $ST_L$ of the shutter glasses ST is open. During even-numbered frame periods, right eye image data $RGB_R$ is written to the display element DIS, and a right eye shutter $ST_R$ of the shutter glasses ST is open. Thus, the observer can view only a left eye image during the odd-numbered frame periods and only a right eye image during the even-numbered periods, thereby obtaining a stereoscopic feeling.

The display element DIS may display a two-dimensional image (hereinafter to as "2D image") in a 2D mode and may display a three-dimensional image (hereinafter to as "3D image") in a 3D mode.

When the related art stereoscopic image display reproduces the 2D image, the related art stereoscopic image display is driven in the same method as the related art driving method. When the related art stereoscopic image display reproduces the 3D image in which a left eye image and a right eye image are divided in time and/or space, the related art stereoscopic image display is driven in a driving method different from the related art driving method. Because of this, if the related art stereoscopic image display converts a data voltage of the 2D image and a data voltage of the 3D image based on the same gamma compensation voltage, gamma characteristics of the 2D image and gamma characteristics of the 3D image may vary. For example, if gamma characteristics of the related art stereoscopic image display are optimized based on the reproduction quality of the 2D image, the gamma characteristics of the 3D image may not be optimized. Accordingly, a brightness perception of the 2D image the user perceives and a brightness perception of the 3D image the user perceives vary.

SUMMARY OF THE INVENTION

The present invention provides a stereoscopic image display and a method for driving the same capable of coinciding gamma characteristics of a two-dimensional (2D) image with gamma characteristics of a three-dimensional (3D) image.

In one aspect, there is a stereoscopic image display comprising a display panel configured to display two-dimensional (2D) image data in a 2D mode and display three-dimensional (3D) image data in a 3D mode, a gamma reference voltage generating circuit configured to generate first gamma reference voltages for the two-dimensional image data and second gamma reference voltages for the three-dimensional image data, output the first gamma reference voltages in the 2D mode, and output the second gamma reference voltages in the 3D mode, the first gamma reference voltages being different from the second gamma reference voltages, and a data driver configured to convert the 2D image data into a 2D data voltage based on the first gamma reference voltages in the 2D mode and output the 2D data voltage to data lines of the display panel, and convert left eye image data and right eye image data into a 3D data voltage based on the second gamma reference voltages in the 3D mode and output the 3D data voltage to the data lines of the display panel.

The stereoscopic image display further comprises a selection signal generating circuit configured to generate a gamma selection signal for selecting the first gamma reference voltages in the 2D mode and the second gamma reference voltages in the 3D mode.

The gamma reference voltage generating circuit includes a first gamma reference voltage generating unit configured to output the first gamma reference voltages, a second gamma reference voltage generating unit configured to output the second gamma reference voltages, and a switching unit configured to select an output of the first gamma reference voltage generating unit in the 2D mode and an output of the second gamma reference voltage generating unit in the 3D mode in response to the gamma selection signal.

The first gamma reference voltage generating unit and the second gamma reference voltage generating unit divide a predetermined high potential power voltage to generate the first gamma reference voltages and the second gamma reference voltages respectively.

The first gamma reference voltages includes a first peak white gray level voltage and the second gamma reference voltages include a second peak white gray level voltage. The predetermined high potential power voltage is input to the first gamma reference voltage generating unit and the second gamma reference voltage generating unit. The second peak white gray level voltage included in the second gamma reference voltages is greater than the first peak white gray level voltage included in the first gamma reference voltages and is less than the predetermined high potential power voltage.

The display panel is one of a liquid crystal display, an organic light emitting diode (OLED) display, and an electrophoresis display.

In another aspect, there is a method for driving a stereoscopic image display, comprising generating first gamma reference voltages for two-dimensional image data and second gamma reference voltages for three-dimensional image data, the first gamma reference voltages being different from the second gamma reference voltages, selecting the first gamma reference voltages in a two-dimensional (2D) mode and selecting the second gamma reference voltages in a three-dimensional (3D) mode, converting 2D image data into a 2D data voltage based on the first gamma reference voltages in the 2D mode, and outputting the 2D data voltage to data lines of a display panel to display the 2D image data on the display panel; and converting left eye image data and right eye image data into a 3D data voltage based on the second gamma reference voltages in the 3D mode, and outputting the 3D data voltage to the data lines of the display panel to display the left eye image data and the right eye image data on the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
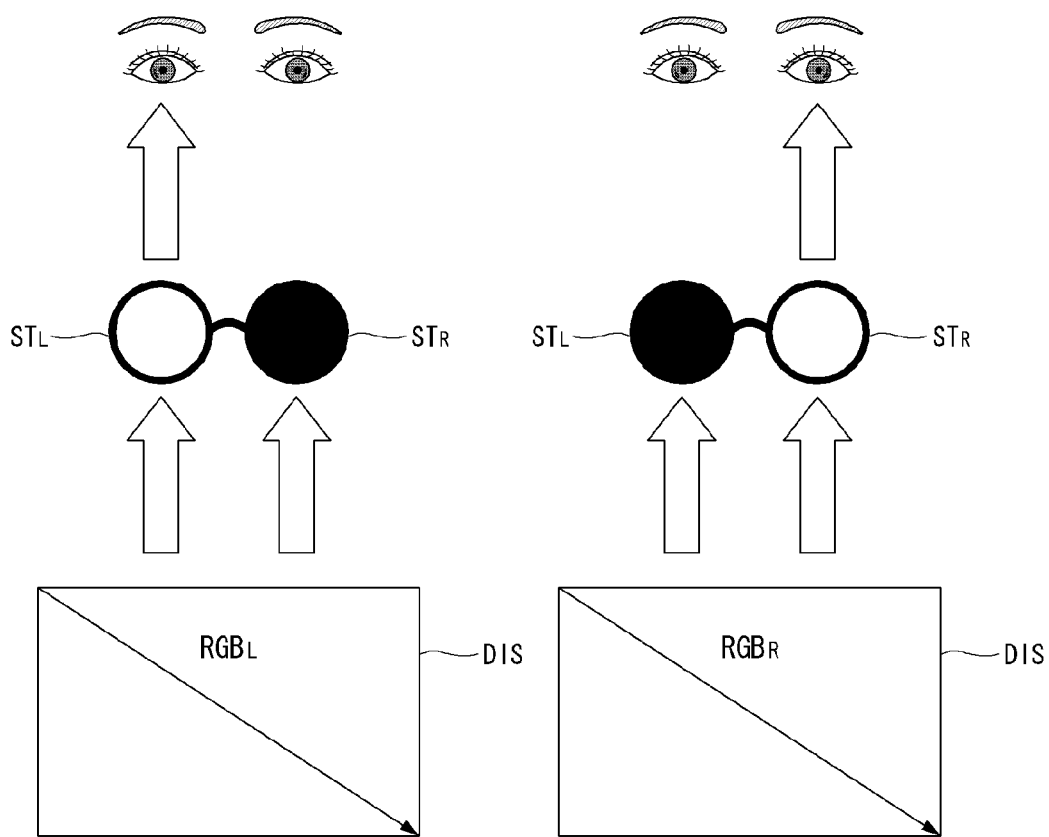
FIG. 1 illustrates a time-division operation of left and right images in a glasses type stereoscopic image display.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Names of elements used in the following description are selected in consideration of facility of specification preparation. Thus, the names of the elements may be different from names of elements used in a real product.

Reference will now be made in detail embodiments of the invention, examples of which are illustrated in the accompanying drawings.

Figure 2:
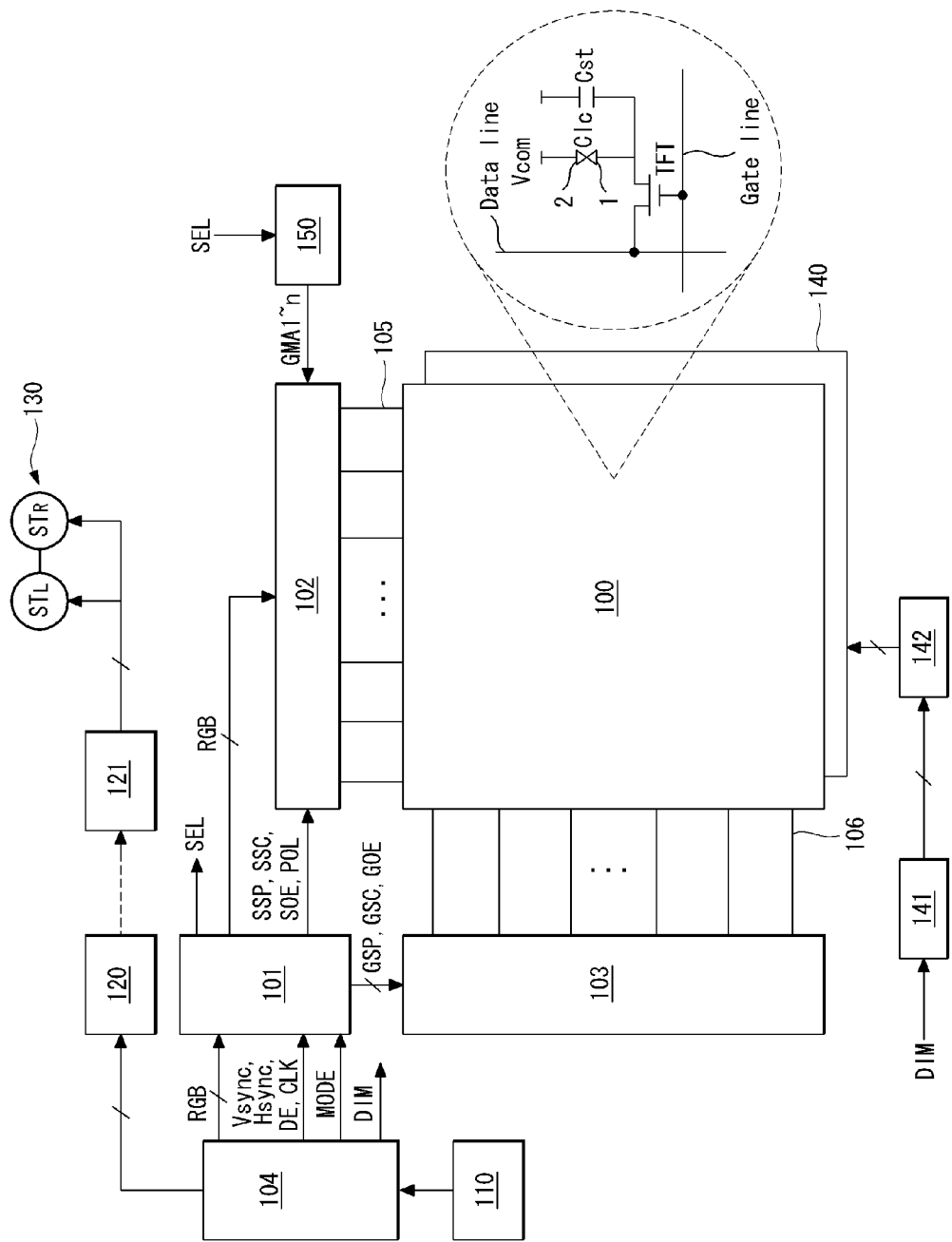
FIG. 2 is a block diagram of a stereoscopic image display according to an exemplary embodiment of the invention.

As shown in FIG. 2, a stereoscopic image display according to an exemplary embodiment of the invention includes a display panel 100, a backlight unit 140, a timing controller 101, a gamma reference voltage generating circuit 150, a data driving circuit 102, a gate driving circuit 103, a backlight controller 141, a light source driver 142, a system board 104, and shutter glasses 130.

The display panel 100 includes an upper glass substrate, a lower glass substrate, and a liquid crystal layer between the upper and lower glass substrates. The display panel 100 includes liquid crystal cells arranged in a matrix form based on a crossing structure of data lines 105 and gate lines 106.

The data lines 105, the gate lines 106, thin film transistors (TFTs), storage capacitors, etc. are formed on the lower glass substrate of the display panel 100. The liquid crystal cells of the display panel 100 are driven by an electric field between a pixel electrode connected to the TFT and a common electrode receiving a common voltage. A black matrix, a color filter, the common electrode, etc, are formed on the upper glass substrate of the display panel 100. Polarizing plates are respectively attached to the upper and lower glass substrates of the display panel 100. Alignment layers for setting a pre-tilt angle of liquid crystals are respectively formed on the upper and lower glass substrates. In a vertical electric field driving manner such as a twisted nematic (TN) mode and a vertical alignment (VA) mode, the common electrode is formed on the upper glass substrate. In a horizontal electric field driving manner such as an in-plane switching (IPS) mode and a fringe field switching (FFS) mode, the common electrode is formed on the lower glass substrate along with the pixel electrode.

The display panel 100 applicable to the exemplary embodiment of the invention may be implemented in any liquid crystal mode as well as the TN, VA, IPS, and FFS modes.

The backlight unit 140 may be implemented as one of an edge type backlight unit and a direct type backlight unit. In the edge type backlight unit, a plurality of light sources are positioned opposite the side of a light guide plate (not shown), and a plurality of optical sheets are positioned between the display panel 100 and the light guide plate. In the direct type backlight unit, a plurality of optical sheets and a diffusion plate are stacked under the display panel 100, and a plurality of light sources are positioned under the diffusion plate. The light sources may be implemented as at least one of a cold cathode fluorescent lamp (CCFL), an external electrode fluorescent lamp (EEFL), and a light emitting diode (LED).

The timing controller 101 supplies a digital video data RGB received from the system board 104 to the data driving circuit 102. The timing controller 101 receives a timing signal, such as a vertical sync signal Vsync, a horizontal sync signal Hsync, a data enable DE, and a dot clock CLK, from the system board 104. The timing controller 101 then generates control signals for controlling an operation timing of each of the data driving circuit 102 and the gate driving circuit 103. The control signals include a gate timing control signal for controlling the operation timing of the gate driving circuit 103 and a data timing control signal for controlling the operation timing of the data driving circuit 102 and a polarity of a data voltage.

The timing controller 101 may switch between operations of a two-dimensional (2D) mode and a three-dimensional (3D) mode based on a mode signal MODE received from the system board 104 or a mode identification code coded to an input image signal. The timing controller 101 or the system board 104 may multiply an input frame frequency of 60 Hz by 'i' to thereby drive the display panel 100 at a frame frequency of (60×i) Hz, where N is a positive integer equal to or greater than 2. The input frame frequency is 50 Hz in a phase alternate line (PAL) manner and is 60 Hz in a national television standards committee (NTSC) manner. When the input frame frequency is multiplied by 4 and is 200 Hz in the PAL manner, one frame period is approximately 5 msec. When the input frame frequency is multiplied by 4 and is 240 Hz in the NTSC manner, one frame period is approximately 4.16 msec.

The gate timing control signal includes a gate start pulse GSP, a gate shift clock GSC, a gate output enable GOE, and the like. The gate start pulse GSP is applied to a first gate driver integrated circuit (IC) to generate a first gate pulse and controls the first gate driver IC so that the first gate pulse is generated by the first gate driver IC. The gate shift clock GSC is a clock commonly input to a plurality of gate driver ICs of the gate driving circuit 103 and also is a clock for shifting the gate start pulse GSP. The gate output enable GOE controls outputs of the gate driver ICs.

The data timing control signal includes a source start pulse SSP, a source sampling clock SSC, a polarity control signal POL, a source output enable SOE, and the like. The source start pulse SSP controls a data sampling start time of the data driving circuit 102. The source sampling clock SSC controls a sampling time of data inside the data driving circuit 102 based on a rising or falling edge. The polarity control signal POL controls a polarity of the data voltage output from the data driving circuit 102. The source output enable SOE controls an output time of the data driving circuit 102. If the digital video data RGB to be input to the data driving circuit 102 is transferred based on a mini low voltage differential signaling (LVDS) interface standard, the source start pulse SSP and the source sampling clock SSC may be omitted.

A method for driving the stereoscopic image display in the 3D mode is different from a method for driving the stereoscopic image display in the 2D mode. If the stereoscopic image display generates a 3D data voltage from 3D image data based on the gamma reference voltages for 2D image data and reproduces the 3D image, the brightness perception of the 3D image the user perceives may be different from the brightness perception of the 2D image the user perceives due to the difference between the driving methods in the 3D mode and the 2D mode. The driving method in the 3D mode according to the exemplary embodiment of the invention converts the 3D image data into the 3D data voltages based on gamma reference voltages for the 3D image data, which are different from the gamma reference voltages for the 2D image data, so that the gamma characteristics of the 3D image, which are the same as the gamma characteristics of the 2D image, can be obtained through an advance experiment.

The timing controller 101 or the system board 104 generates a gamma selection signal SEL for selecting first gamma reference voltages for the 2D image data in the 2D mode and second gamma reference voltages for the 3D image data in the 3D mode. A logic value of the gamma selection signal SEL in the 2D mode is different from a logic value of the gamma selection signal SEL in the 3D mode, so that the 2D mode and the 3D mode are distinguished from each other. The gamma reference voltage generating circuit 150 outputs the first gamma reference voltages for the 2D image data in the 2D mode and outputs the second gamma reference voltages for the 3D image data in the 3D mode in response to the gamma selection signal SEL. The first gamma reference voltages for the 2D image data and the second gamma reference voltages for the 3D image data are set to be different from each other through the advance experiment, so that the brightness perception of the 2D image the user perceives is the same as the brightness perception of the 3D image the user perceives.

The data driving circuit 102 includes a plurality of source driver ICs. Each of the source driver ICs includes a shift register, a latch, a digital-to-analog converter (DAC), an output buffer, and the like. The data driving circuit 102 latches the digital video data RGB under the control of the timing controller 101. The data driving circuit 102 converts the latched digital video data RGB into data voltage based on gamma reference voltages GMA1 to GMAn from the gamma reference voltage generating circuit 150 and inverts the polarity of the data voltage in response to the polarity control signal POL.

The gate driving circuit 103 sequentially supplies a gate pulse synchronized with the data voltage to the gate lines 106 in response to the gate timing control signals.

The backlight controller 141 transmits backlight control data, that includes a control value of a duty ratio of a pulse width modulation (PWM) signal controlled based on a global or local dimming signal DIM received from the system board 104 or the timing controller 101, to the light source driver 142 in a serial peripheral interface (SPI) data format, so that a backlight luminance is controlled in response to the global/local dimming signal DIM. In the 3D mode, the backlight controller 141 adjusts the control value of the PWM duty ratio in the duty ratio less than the 2D mode under the control of the timing controller 101 or the system board 104, so as to reduce 3D crosstalk, in which the user view an overlapping image of the left eye image and the right eye image. The backlight controller 141 may be mounted inside the timing controller 101.

The light source driver 142 turns on and off the light sources in response to the backlight control data from the backlight controller 141.

The system board 104 supplies 2D image data or 3D image data and the timing signals Vsync, Hsync, DE and CLK to the timing controller 101 through an interface, such as a low voltage differential signaling (LVDS) interface and a transition minimized differential signaling (TMDS) interface. The system board 104 supplies a 2D image to the timing controller 101 in the 2D mode and supplies a 3D image including a left eye image and a right eye image to the timing controller 101 in the 3D mode. The system board 104 may transmit the 2D image data and the 3D image data at the frame frequency of (60×i) Hz. The system board 104 or the timing controller 101 analyzes the 2D image data or the 3D image data and calculates a global or local diming value capable of increasing contrast characteristics of a display image based on the result of an analysis, thereby generating the global or local dimming signal DIM.

A user may select the 2D mode or the 3D mode using a user input device 110. The user input device 110 includes a touch screen, an on-screen display (OSD), a keyboard, a mouse, a remote controller, etc. that are attached to or mounted inside the display panel 100. The system board 104 may switch between an operation of the 2D mode and an operation of the 3D mode in response to user data input through the user input device 110. The system board 104 may switch between the operation of the 2D mode and the operation of the 3D mode through a 2D or 3D identification code encoded to input image data.

In the 3D mode, the system board 104 outputs a shutter control signal to a shutter control signal transmission unit 120 so as to alternatively open and close a left eye shutter $ST_L$ and a right eye shutter $ST_R$ of the shutter glasses 130. The shutter control signal transmission unit 120 transmits the shutter control signal to a shutter control signal reception unit 121 through a wire or wireless interface. The shutter control signal reception unit 121 may be mounted inside the shutter glasses 130. Alternatively, the shutter control signal reception unit 121 may be manufactured as a separate module and may be attached to the shutter glasses 130.

The shutter glasses 130 include the left eye shutter $ST_L$ and the right eye shutter $ST_R$ which are separately controlled electrically. Each of the left eye shutter $ST_L$ and the right eye shutter $ST_R$ includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and an ON or OFF voltage are supplied to the second transparent electrode. When the ON voltage is supplied to the second transparent electrode of each of the left and right eye shutters $ST_L$ and $ST_R$, each of the left and right eye shutters $ST_L$ and $ST_R$ transmits light from the display panel 100. On the other hand, when the OFF voltage is supplied to the second transparent electrode of each of the left and right eye shutters $ST_L$ and $ST_R$, each of the left and right eye shutters $ST_L$ and $ST_R$ blocks light from the display panel 100.

The shutter control signal reception unit 121 receives the shutter control signal through the wire/wireless interface. The shutter control signal reception unit 121 alternately opens and closes the left and right eye shutters $ST_L$ and $ST_R$ of the shutter glasses 130 in response to the shutter control signal. When the shutter control signal of a first logic value is input to the shutter control signal reception unit 121, the ON voltage is supplied to the second transparent electrode of the left eye shutter $ST_L$ and the OFF voltage is supplied to the second transparent electrode of the right eye shutter $ST_R$. When the shutter control signal of a second logic value is input to the shutter control signal reception unit 121, the OFF voltage is supplied to the second transparent electrode of the left eye shutter $ST_L$ and the ON voltage is supplied to the second transparent electrode of the right eye shutter $ST_R$. Accordingly, the left eye shutter $ST_L$ of the crystal shutter glasses 130 is open when the shutter control signal of the first logic value is generated, and the right eye shutter $ST_R$ of the shutter glasses 130 is open when the shutter control signal of the second logic value is generated.

Figure 3:
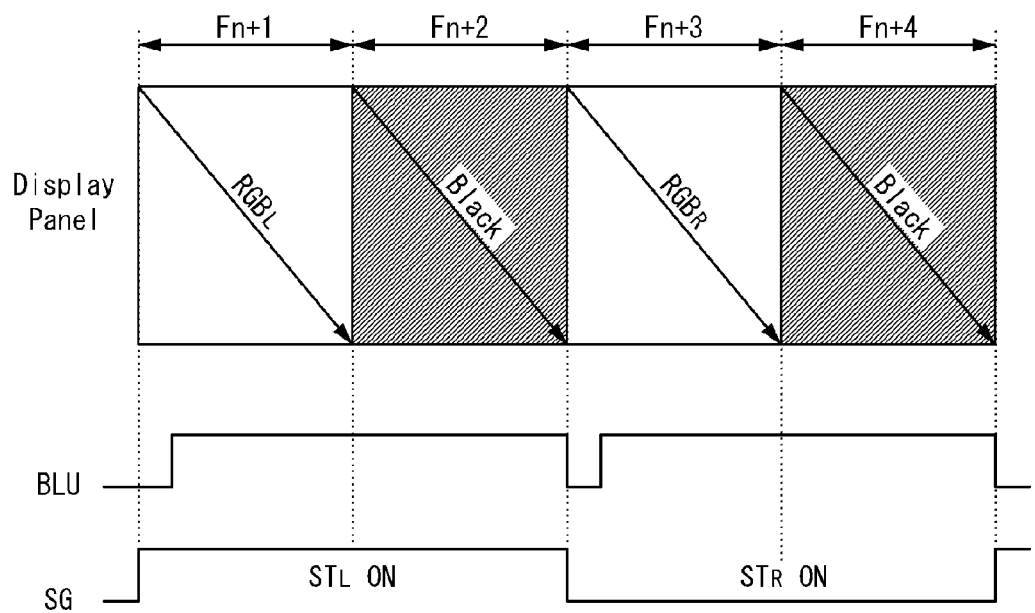
FIG. 3 is a waveform diagram illustrating a method for driving a stereoscopic image display according to an exemplary embodiment of the invention.

FIG. 3 is a waveform diagram illustrating a method for driving the stereoscopic image display according to the exemplary embodiment of the invention.

As shown in FIG. 3, in the stereoscopic image display according to the exemplary embodiment of the invention, left eye image data and right eye image data are alternatively supplied to the display panel 100 during odd-numbered frame periods Fn+1 and Fn+3 in the 3D mode, so as to reduce the 3D crosstalk. In the stereoscopic image display according to the exemplary embodiment of the invention, the data with a black gray level are supplied to all of pixels of the display panel 100 during even-numbered frame periods Fn+2 and Fn+4 in the 3D mode. The timing controller 101 repeatedly supplies black gray level data (for example, "000000002") stored in a built-in resistor to the data driving circuit 102 during the even-numbered frame periods Fn+2 and Fn+4 in the 3D mode.

More specifically, the data driving circuit 102 converts left eye image data $RGB_L$ received from the timing controller 101 into a left eye data voltage based on second gamma reference voltages GMA1(3D) to GMAn(3D) for 3D image data, and outputs the left eye data voltage to the data lines 105 during the (n+1)th frame period Fn+1 in the 3D mode, where n is a positive integer. The data driving circuit 102 converts the black gray level data received from the timing controller 101 into a black gray level voltage based on the second gamma reference voltages GMA1(3D) to GMAn(3D) for 3D image data, and outputs the black gray level voltage to the data lines 105 during the (n+2)th frame period Fn+2 in the 3D mode.

The data driving circuit 102 converts right eye image data $RGB_R$ received from the timing controller 101 into a right eye data voltage based on the second gamma reference voltages GMA1(3D) to GMAn(3D) for 3D image data, and outputs the right eye data voltage to the data lines 105 during the (n+3)th frame period Fn+3 in the 3D mode. The data driving circuit 102 converts the black gray level data received from the timing controller 101 into the black gray level voltage based on the second gamma reference voltages GMA1(3D) to GMAn(3D) for 3D image data, and outputs the black gray level voltage to the data lines 105 during the (n+4)th frame period Fn+4 in the 3D mode.

The data driving circuit 102 converts 2D image data received from the timing controller 101 into a 2D data voltage based on first gamma reference voltages GMA1(2D) to GMAn(2D) for 2D image data, and outputs the 2D data voltage to the data lines 105 during the (n+1)th to (n+4)th frame periods Fn+1 to Fn+4 in the 2D mode.

In the 3D mode, during every two adjacent frames, the light sources of the backlight unit 140 are first turned off from the beginning of the first frame period for a predetermined time and then turned on during the rest of the first frame period and the second frame period. The predetermined time can be set by taking a liquid crystal response delay time of the display pane 100 and the shutter glasses 130 into account. For example, the light sources of the backlight unit 140 are first turned off from the beginning of the (n+1)th frame period Fn+1 for a predetermined time and then turned on during the rest of the (n+1)th frame period Fn+1 and the (n+2)th frame period Fn+2. Similarly, the light sources of the backlight unit 140 are first turned off from the beginning of the (n+3)th frame period Fn+3 for a predetermined time and then turned on during the rest of the (n+3)th frame period Fn+3 and the (n+4)th frame period Fn+4. In the 2D mode, the light sources of the backlight unit 140 emit light in a duty ratio greater than the duty ratio for the 3D mode as shown in FIG. 3 during every four frame periods from the (n+1)th to (n+4)th frame periods Fn+1 to Fn+4.

The left eye shutter $ST_L$ of the shutter glasses 130 is open during the (n+1)th and (n+2)th frame periods Fn+1 and Fn+2, and the right eye shutter $ST_R$ of the shutter glasses 130 is open during the (n+3)th and (n+4)th frame periods Fn+3 and Fn+4. Thus, because the user alternatively views the left eye image and the right eye image with his or her left eye and right eye in the 3D mode, the user can view the 3D image with the stereoscopic feeling.

Figure 4:
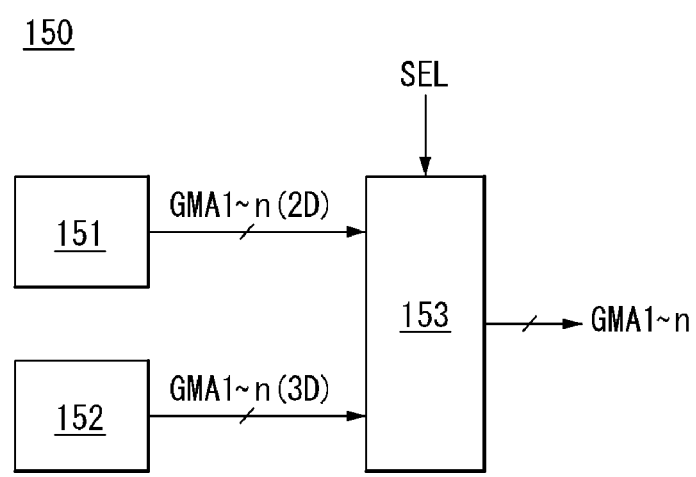
FIGS. 4 and 5 are circuit diagrams illustrating a gamma reference voltage generating circuit shown in FIG. 2.
Figure 5:
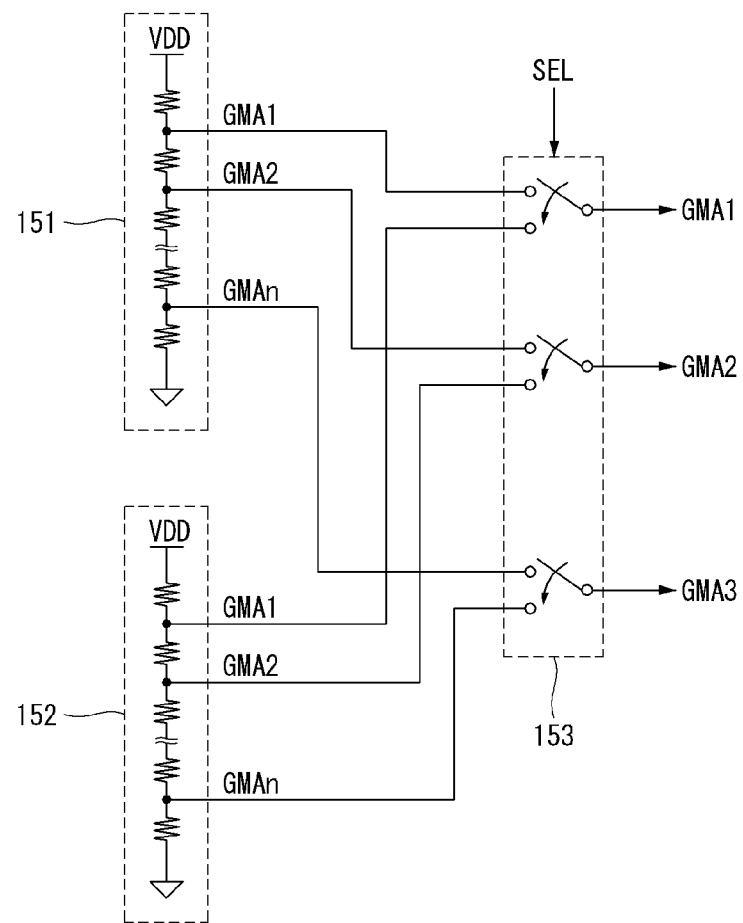

FIGS. 4 and 5 are circuit diagrams illustrating in detail the gamma reference voltage generating unit 150 shown in FIG. 2.

As shown in FIG. 4, the gamma reference voltage generating circuit 150 includes a first gamma reference voltage generating unit 151 generating the first gamma reference voltages GMA1 to GMAn(2D) for 2D image data, a second gamma reference voltage generating unit 152 generating the second gamma reference voltages GMA1v(3D) to GMAn (3D) for 3D image data, a switching unit 153 selecting the first gamma reference voltages GMA1(2D) to GMAn(2D) or the second gamma reference voltages GMA1(3D) to GMAn (3D) in response to a gamma section signal SEL.

The first gamma reference voltage generating unit 151 generates the first gamma reference voltages GMA1(2D) to GMAn(2D) satisfying the optimum gamma characteristics (for example, 2.2 gamma curve) of the 2D image through the advance experiment. As shown in FIG. 5, the first gamma reference voltage generating unit 151 divides a high potential power voltage VDD by a resistor string and outputs the first gamma reference voltages GMA1(2D) to GMAn(2D) of n stages, where n is a positive integer equal to or greater than 2.

The second gamma reference voltage generating unit 152 generates the second gamma reference voltages GMA1(3D) to GMAn(3D) satisfying the optimum gamma characteristics (for example, 2.2 gamma curve) of the 3D image through the advance experiment. As shown in FIG. 5, the second gamma reference voltage generating unit 152 divides the high potential power voltage VDD by the resistor string and outputs the second gamma reference voltages GMA1(3D) to GMAn(3D) of n stages, where n is a positive integer equal to or greater than 2.

The first gamma reference voltage generating unit 151 and the second gamma reference voltage generating units 152, both of which may be implemented as a programmable gamma voltage generating circuit which converts the digital gamma data stored in a memory into an analog voltage, may generate the gamma reference voltages GMA1(2D) to GMAn(2D) and GMA1(3D) to GMAn(3D) respectively. The programmable gamma voltage generating circuit may adjust the digital gamma data stored in the memory based on serial data input through I2C communication interface. Thus, the gamma reference voltages GMA1(2D) to GMAn(2D) and GMA1(3D) to GMAn(3D) output from the programmable gamma voltage generating circuit may be adjusted by the serial data received from the outside.

In the 2D mode, the switching unit 153 selects an output of the first gamma reference voltage generating unit 151 in response to the gamma section signal SEL and transmits the output of the first gamma reference voltage generating unit 151 to the data driving circuit 102. In the 3D mode, the switching unit 153 selects an output of the second gamma reference voltage generating unit 152 in response to the gamma section signal SEL and transmits the output of the second gamma reference voltage generating unit 152 to the data driving circuit 102.

Figure 6:
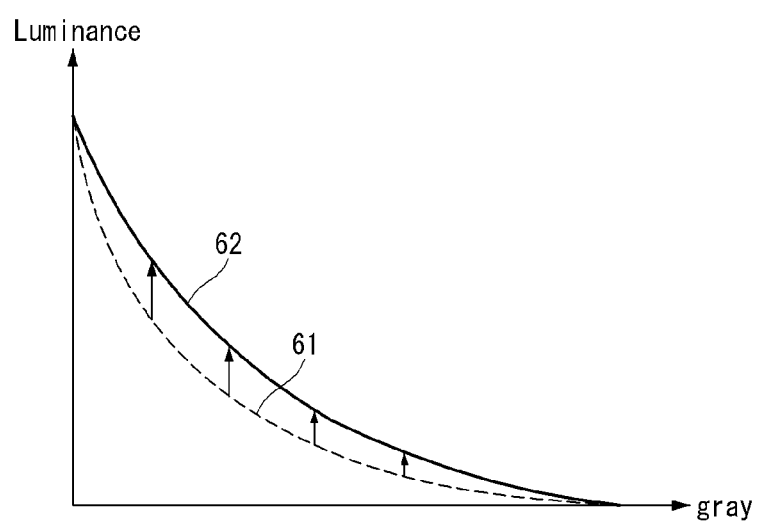
FIG. 6 is a graph comparing gamma characteristics of a related art with gamma characteristics of an exemplary embodiment of the invention.

In the related art, if the image data is converted into the data voltages based on the same gamma reference voltages in the 2D and 3D modes, a gamma curve 61 for the 3D image will be less than 2.2 gamma curve 62 for the 2D image indicated by dotted line in the graph of FIG. 6 because of a difference between a driving method of the 2D image and a driving method of the 3D image. Thus, in the exemplary embodiment of the invention, a resistance value of the resistor string of the first gamma reference voltage generating unit 151 and a resistance value of the resistor string of the second gamma reference voltage generating unit 152 are set to be different from each other, or the digital gamma data stored in the memory is set to be different from each other. The following Table 1 indicates the gamma compensation voltages allowing the gamma curve 61 of the 3D image to be similar to the 2.2 gamma curve 62 of the 2D image through the experiment for controlling the first and second gamma reference voltages GMA1(2D) to GMAn(2D) and GMA1(3D) to GMAn(3D) when the 3D image is reproduced through the method illustrated in FIG. 3.

TABLE 1

|  | Related Art | Embodiment of the invention |
| --- | --- | --- |
| VDD & GMA1 for 2D image | VDD = 18 V, GMA1 = 16.5 V | VDD = 20 V, GMA1 = 16.5 V |
| VDD & GMA1 for 3D image | VDD = 18 V, GMA1 = 16.5 V | VDD = 20 V, GMA1 = 18 V |

In the above Table 1, the first gamma reference voltage GMA1 is a gamma compensation voltage of a peak white gray level, for example, a gray level '255' in 8-bit input data. As indicated in the above Table 1, a peak white gray level voltage GMA of the second gamma reference voltages GMA1(3D) to GMAn(3D) has to be set to be greater than a peak white gray level voltage GMA of the first gamma reference voltages GMA1(2D) to GMAn(2D), so as to substantially coincide the gamma curve of the 3D image with the 2.2 gamma curve of the 2D image.

Figure 7:
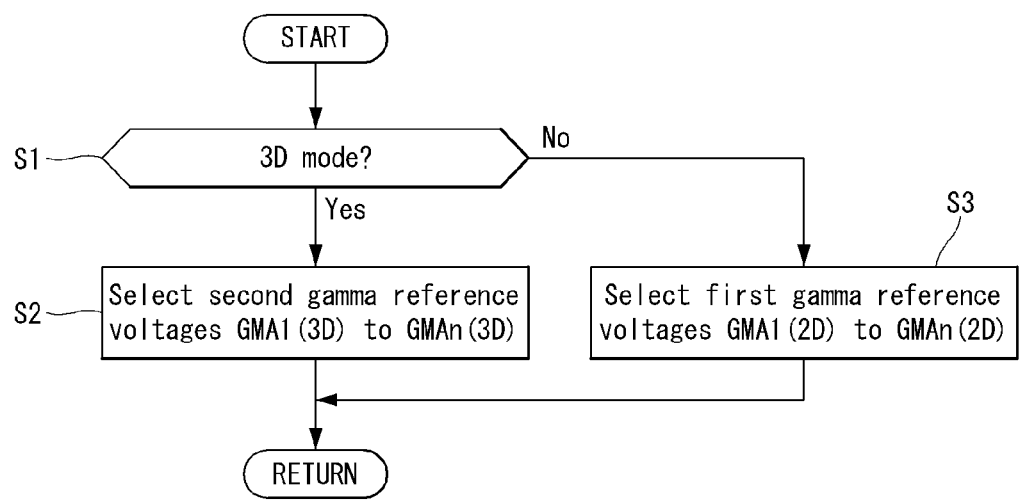
FIG. 7 is a flow chart illustrating a method for selecting a gamma reference voltage in a method for driving a stereoscopic image display according to an exemplary embodiment of the invention.

FIG. 7 is a flow chart illustrating a method for selecting the gamma reference voltages when driving the stereoscopic image display according to the exemplary embodiment of the invention. As shown in FIG. 7, the method for driving the stereoscopic image display according to the exemplary embodiment of the invention converts data into the first gamma reference voltages GMA1(2D) to GMAn(2D) in the 2D mode in steps S1 and S3. The driving method converts data into the second gamma reference voltages GMA1(3D) to GMAn(3D) in the 3D mode in steps S1 and S2.

The display panel 100 may be implemented as other display panels such as a display panel of an electroluminescence device (EL) including an organic light emitting diode (OLED) and a display panel of an electrophoresis display (EPD) other than a liquid crystal display element. Thus, the backlight unit 140, the backlight controller 141, the light source driver 142, etc. may be omitted depending on the selected display panel 100.

As described above, the stereoscopic image display according to the exemplary embodiment of the invention drives the 3D image using the gamma compensation voltages of the 3D image different from the gamma compensation voltages of the 2D image, thereby coinciding the gamma characteristics of the 3D image with the gamma characteristics of the 2D image. As a result, the stereoscopic image display according to the exemplary embodiment of the invention can optimize the image quality of both of the 2D image and the 3D image.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display, comprising:
   a display panel configured to display two-dimensional (2D) image data in a 2D mode and display three-dimensional (3D) image data in a 3D mode;
   a gamma reference voltage generating circuit configured to generate first gamma reference voltages for the two-dimensional image data and second gamma reference voltages for the three-dimensional image data, output the first gamma reference voltages in the 2D mode, and output the second gamma reference voltages in the 3D mode, the first gamma reference voltages being different from the second gamma reference voltages; and
   a data driver configured to convert the 2D image data into a 2D data voltage based on the first gamma reference voltages in the 2D mode and output the 2D data voltage to data lines of the display panel, and convert left eye image data and right eye image data into a 3D data voltage based on the second gamma reference voltages in the 3D mode and output the 3D data voltage to the data lines of the display panel, wherein the first gamma reference voltages include a first peak white gray level voltage less than a predetermined high potential power voltage, and the second gamma reference voltages include a second peak white gray level voltage less than the predetermined high potential power voltage, wherein the second peak white gray level voltage is greater than the first peak white gray level voltage, wherein a gamma curve of the 2D image perceived by a user is the same as the gamma curve of the 3D image perceived by the user, and wherein the first gamma reference voltages and the second gamma reference voltages allow a gamma curve of the 3D image to coincide a gamma curve of the 2D image.

2. The stereoscopic image display of claim 1, further comprising a selection signal generating circuit configured to generate a gamma selection signal for selecting the first gamma reference voltages in the 2D mode and the second gamma reference voltages in the 3D mode.

3. The stereoscopic image display of claim 2, wherein the gamma reference voltage generating circuit includes:
    a first gamma reference voltage generating unit configured to output the first gamma reference voltages;
    a second gamma reference voltage generating unit configured to output the second gamma reference voltages; and
    a switching unit configured to select an output of the first gamma reference voltage generating unit in the 2D mode and an output of the second gamma reference voltage generating unit in the 3D mode in response to the gamma selection signal.

4. The stereoscopic image display of claim 3, wherein the first gamma reference voltage generating unit and the second gamma reference voltage generating unit divide the predetermined high potential power voltage to generate the first gamma reference voltages and the second gamma reference voltages respectively.

5. The stereoscopic image display of claim 1, wherein the display panel is one of a liquid crystal display, an organic light emitting diode (OLED) display, and an electrophoresis display.

6. A method for driving a stereoscopic image display, the method comprising:
    generating first gamma reference voltages for two-dimensional image data and second gamma reference voltages for three-dimensional image data, the first gamma reference voltages being different from the second gamma reference voltages;
    selecting the first gamma reference voltages in a two-dimensional (2D) mode and selecting the second gamma reference voltages in a three-dimensional (3D) mode;
    converting 2D image data into a 2D data voltage based on the first gamma reference voltages in the 2D mode, and outputting the 2D data voltage to data lines of a display panel to display the 2D image data on the display panel; and
    converting left eye image data and right eye image data into a 3D data voltage based on the second gamma reference voltages in the 3D mode, and outputting the 3D data voltage to the data lines of the display panel to display the left eye image data and the right eye image data on the display panel, wherein the first gamma reference voltages include a first peak white gray level voltage less than a predetermined high potential power voltage, and the second gamma reference voltages include a second peak white gray level voltage less than the predetermined high potential power voltage, wherein the second peak white gray level voltage is greater than the first peak white gray level voltage, wherein a gamma curve of the 2D image perceived by a user is the same as the gamma curve of the 3D image perceived by the user, and wherein the first gamma reference voltages and the second gamma reference voltages allow a gamma curve of the 3D image to coincide a gamma curve of the 2D image.

7. The method of claim 6, further comprising generating a gamma selection signal for selecting the first gamma reference voltages in the 2D mode and the second gamma reference voltages in the 3D mode.

8. The method of claim 7, wherein the selecting of the first gamma reference voltages in the 2D mode and the selecting of the second gamma reference voltages in the 3D mode comprise selecting the first gamma reference voltages and the second gamma reference voltages in response to the gamma selection signal.

* * * * *